(12) United States Patent
Chittum (10) Patent No.: US 7,117,860 B1
(45) Date of Patent: Oct. 10, 2006

(54) COIL HOUSING FOR A MOTORCYCLE

(76) Inventor: Jeremy F. Chittum, 14030 Lambert Rd., Whittier, CA (US) 90605

( * ) Notice: Subject to any disclaimer, the term of this patent is extended or adjusted under 35 U.S.C. 154(b) by 0 days.

(21) Appl. No.: 11/180,340

(22) Filed: Jul. 14, 2005

(51) Int. Cl.
*F02B 3/02* (2006.01)
*F02B 67/00* (2006.01)

(52) U.S. Cl. .................................. 123/635; 123/195 E (58) Field of Classification Search ............ 123/195 A, 123/195 E, 635
See application file for complete search history.

(56) References Cited

FOREIGN PATENT DOCUMENTS

EP          EP0508374 A1 * 10/1992

* cited by examiner

*Primary Examiner*—Noah P. Kamen
(74) *Attorney, Agent, or Firm*—Don E. Erickson (57) ABSTRACT

Described herein is a coil housing for receiving a plurality of coils for a two-cylinder motorcycle having a plurality of spark plugs and ignition coils. The invention consists of a plurality of coil receptacles conjoined by frame mounting means for attaching the coil housing to the motorcycle such that each coil housing is juxtaposed adjacent a cylinder of the motorcycle. Each coil receptacle defines a cavity having means for retaining a coil and spark plug wires for connection between the output terminals of the coils and the terminals of the spark plugs. When the coil housing is mounted to a motorcycle, the external surface conforms to the corresponding external surface of each of the cylinder.

20 Claims, 7 Drawing Sheets

COIL HOUSING FOR A MOTORCYCLE

BACKGROUND OF THE INVENTION

1. Field of Use

The present invention relates to V-type, two-cylinder, internal combustion engines for motorcycles in which the spark plugs for the cylinders are mounted adjacent the rocker boxes and parallel to the longitudinal axis of each cylinder. The invention pertains to a means for positioning the ignition coils of such engines adjacent to the spark plugs.

2. Prior Art

Figure 1:
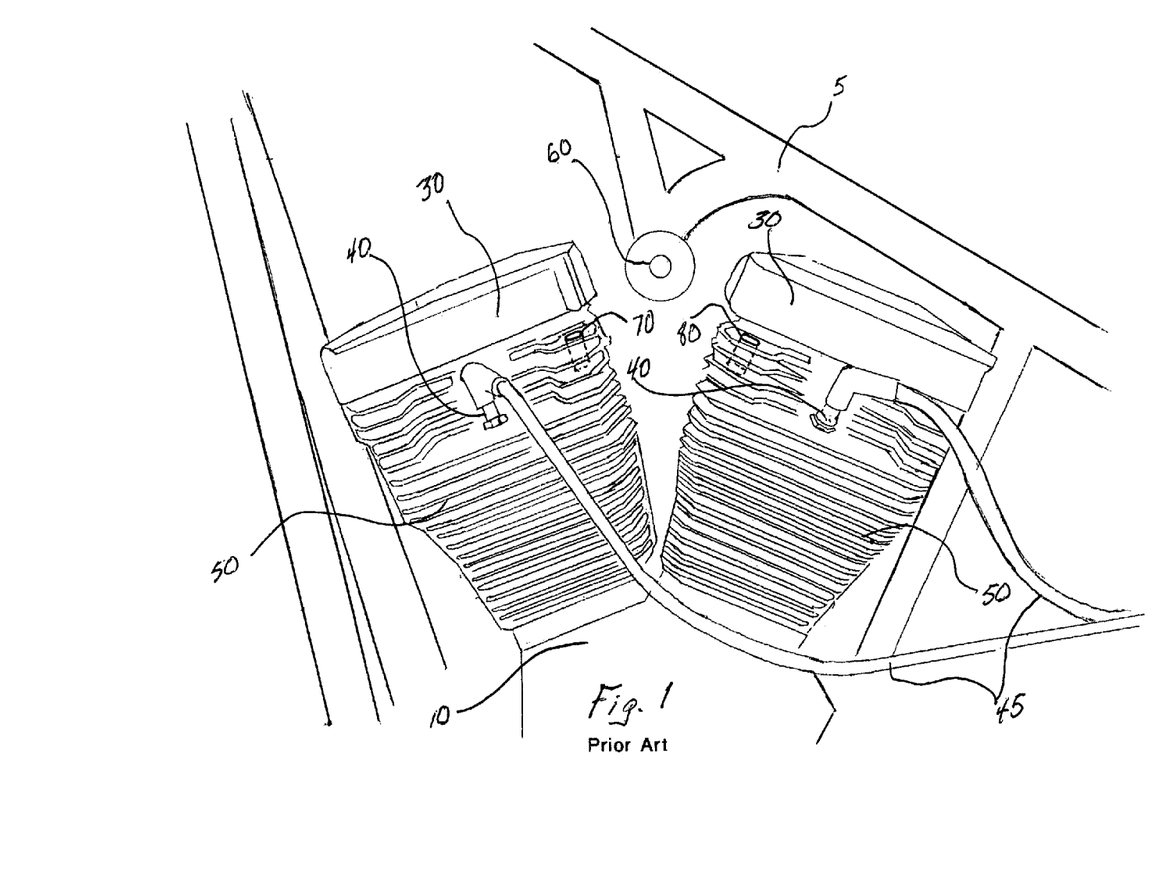
FIG. 1 is side view of the engine portion of a motorcycle.

V-type two-cylinder motorcycle engines are well known to those of ordinary skill in the art. Typical of such engines are described in U.S. Pat. No. 4,558,676 to Seidl, and U.S. Pat. No. 6,729,294 to Okano, et al. In such V-type engines there is typically a coil for each cylinder mounted adjacent the battery and/or the generator of the motorcycle, or other location on the frame of the motorcycle. In other V-type engines there is only one coil for controlling both spark plugs. An ignition coil (also called a spark coil) is an electrical device in a motorcycle's ignition system that transforms a storage battery's 12 volts to the thousands of volts needed to spark the spark plugs. This ignition coil is a specific form of the induction coil that converts current from a battery into the high voltage current required by spark plugs in an internal combustion engine. The output of each coil is electrically connected to the terminal, or cap of the spark plug by means of a wire extending from the coil to the spark plug. As shown in FIG. 1, the spark plug wires are typically run external to the motorcycle engine. Since insulated spark plug wires are more expensive than regular electrical wire, it would be economically beneficial to devise a structure that enables the reduction in the length of the spark plug wires. One of ordinary skill in the art would know that the insulation portion of spark plugs are typically made of ceramic, and somewhat brittle. Thus, the exposed spark plug is subject to damage if there are any physical problems with the motorcycle. Such as crashes or collisions. It would also be beneficial to devise a structure that would provide a barrier to such physical damage.

The present invention overcomes both these disadvantages and provides a solution to both the economics of the insulated spark plug wires and protects the spark plugs from physical damage.

SUMMARY OF THE INVENTION

The present invention consists of housing for receiving the ignition coils wherein the housing is mounted directly on the cylinder block adjacent the spark plugs. The coil housing is mounted jointly to the frame of the motorcycle and to each of the cylinders. Included within the housing are spark plug wires for connecting from the output terminals of the ignition coils to the terminals of the spark plugs.

DETAILED DESCRIPTION OF THE INVENTION

Figure 2:
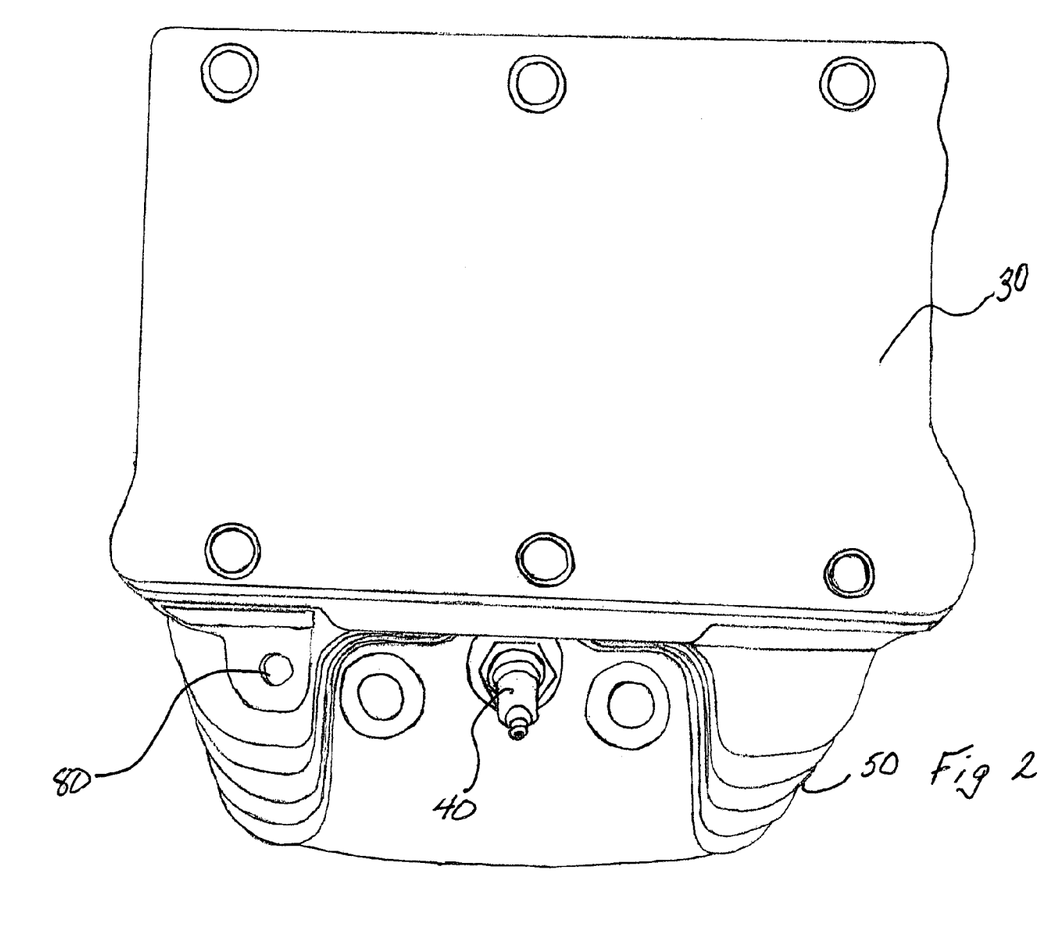
FIG. 2 is a top view of one cylinder of the motorcycle showing the location of the spark plug relative to the rocker arm cover.

FIG. 1 discloses a front view of a generic V-type, two-cylinder motorcycle engine 10 mounted to the frame of the motorcycle. Each cylinder has a rocker box 30, a spark plug 40, and cooling fins 50 extending perpendicular to the longitudinal axis of each cylinder. Spark plug wires 45 extend from the terminal of spark plugs 40 to ignition coils mounted at some selected location on the motorcycle (not shown). Also disclosed is a standard frame mount aperture 60 and cylinder mount apertures 70 and 80. Cylinder mount apertures 70 and 80 are typically machine-threaded to accept standard 5/16 inch machine bolts. FIG. 2 is a top view of the cylinder showing the recess within which spark plug 40 is mounted in the cylinder block. Also shown is cylinder motor mount aperture 80.

Figure 3:
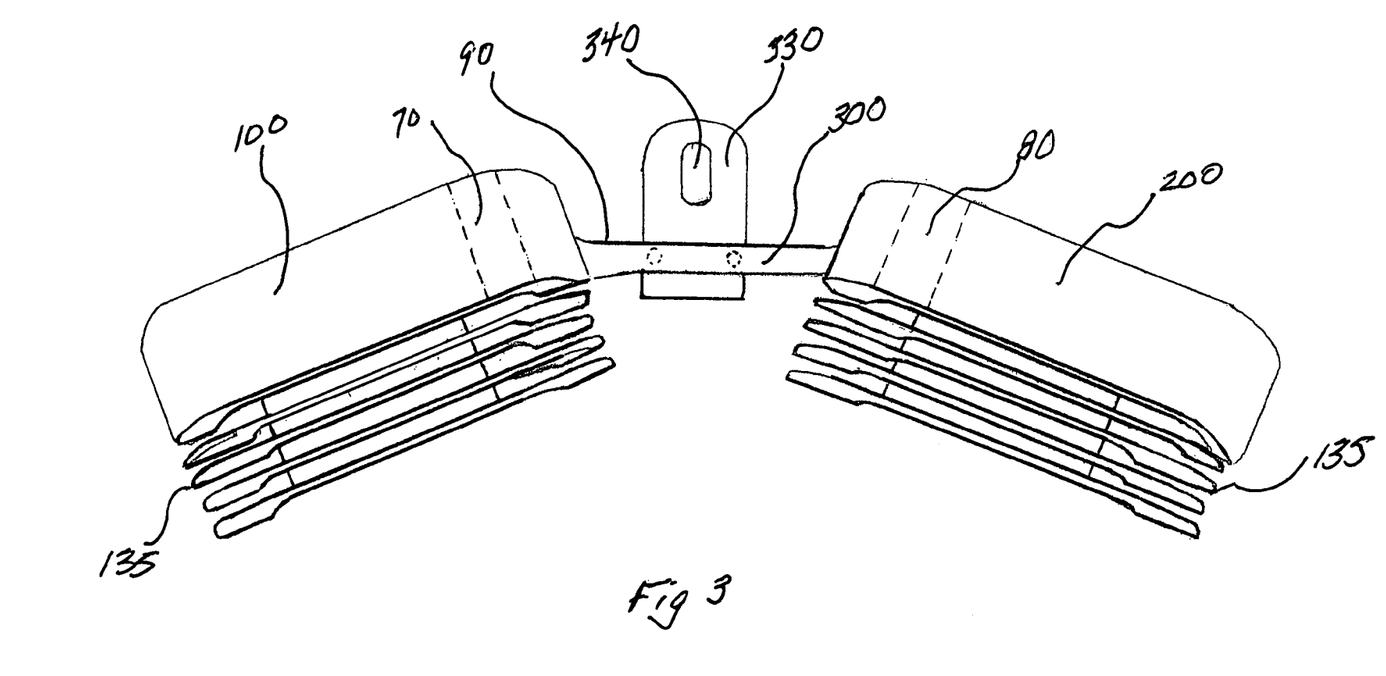
FIG. 3 is a front view of the coil housing of the invention.

FIG. 3 discloses the front view of the coil housing 90 of the invention attached to frame mount 330. Frame aperture 340 enables coil housing 90 to be mounted to frame 5 of the motorcycle using a standard machine bolt. Also shown are cooling fins 135.

Figure 4:
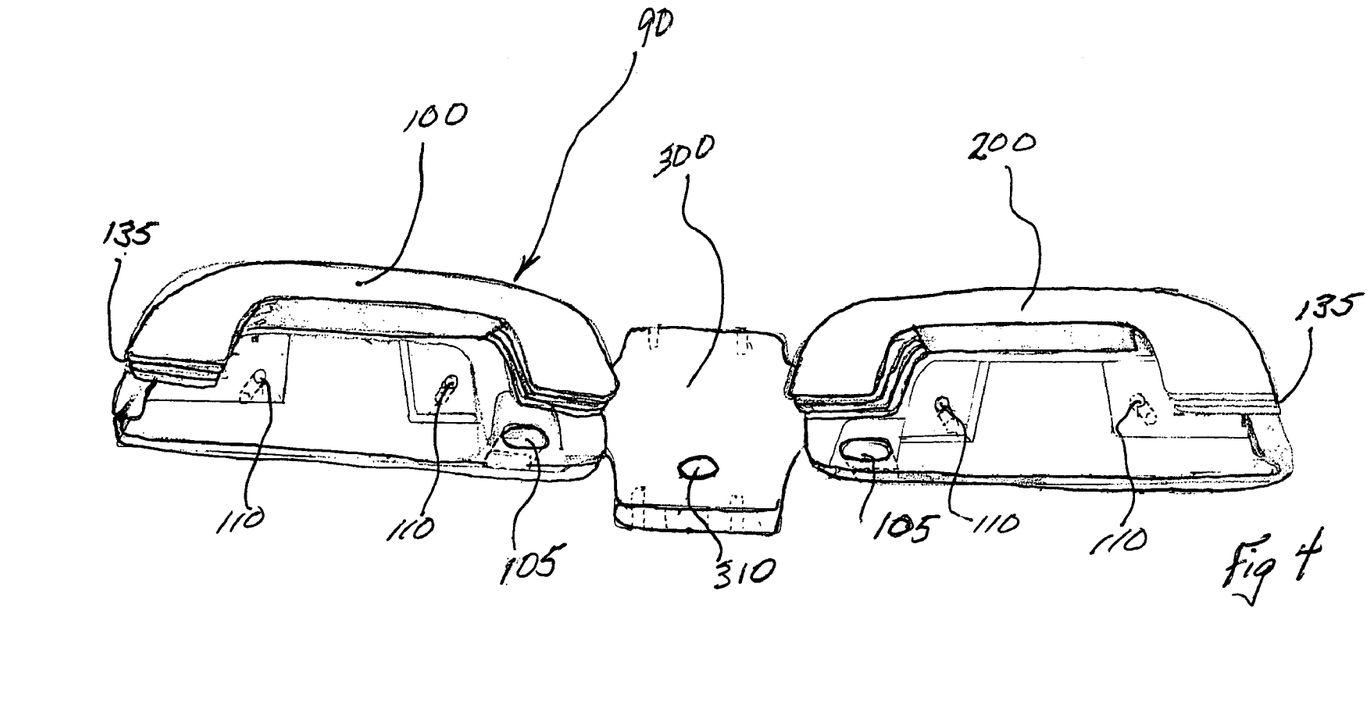
FIG. 4 is a perspective view of the coil housing of the invention.
Figures 5, 6:
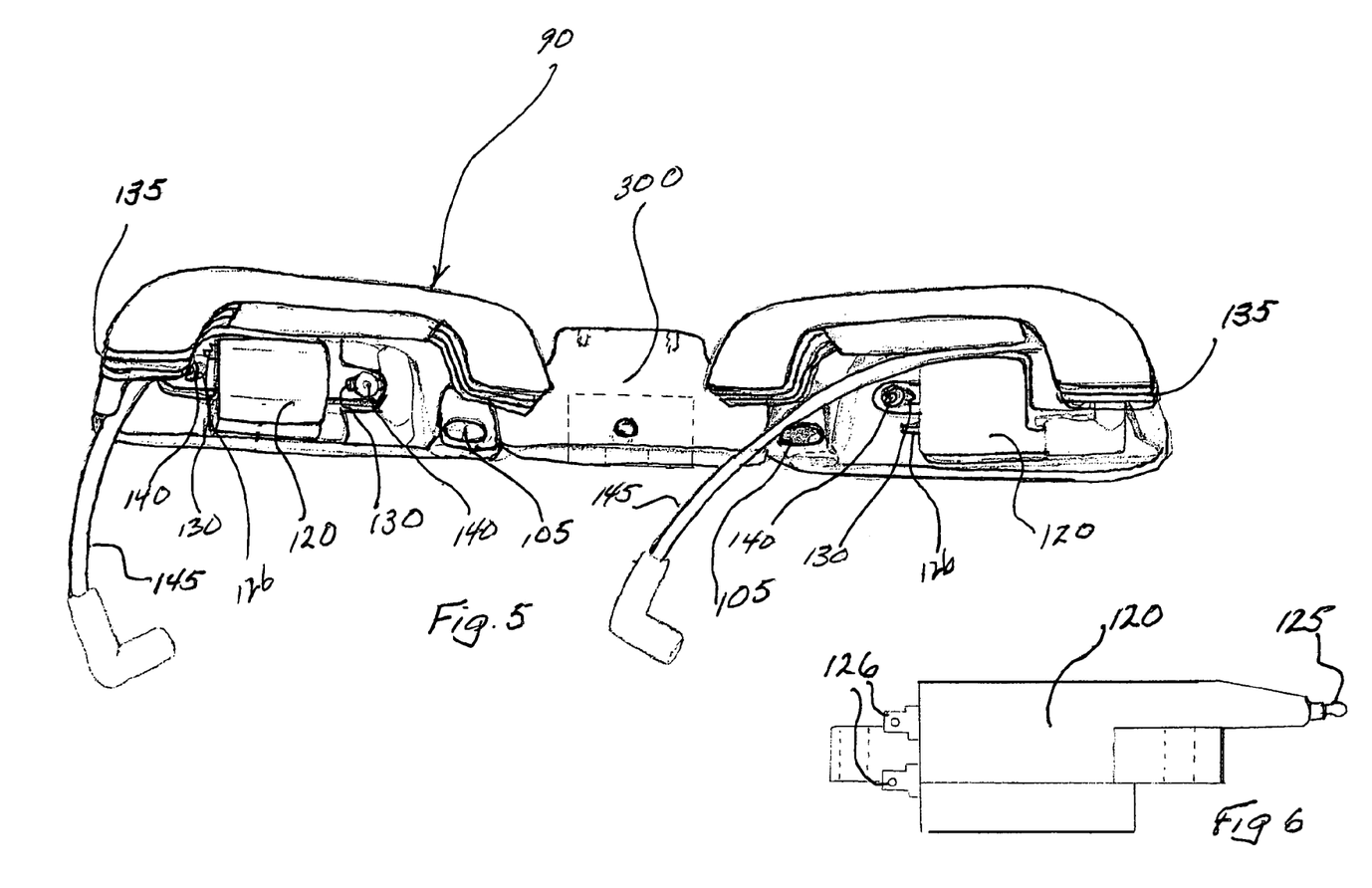
FIG. 5 is a perspective view of the coil housing of the invention including ignition coils and spark plug wires.
FIG. 6 is a side view of a typical ignition coil.

FIGS. 4 and 5 disclose a pair of coil receptacles 100 and 200, each coil receptacle defining a cavity having a substantially elongated rectangular shape. As viewed in FIGS. 4 and 5, the bottom surfaces of the cavities in each drawing are the upper surfaces of the coil receptacles when mounted on the cylinders of the motorcycle. The front open portion of the cavities abuts the upper portion of the cylinders of the motorcycle, encapsulating the spark plugs. The interior of the cavity is shaped to permit an ignition coil to be mounted therewithin. The external dimensions of each receptacle is sized to fittingly mate with the respective cylinder block of the motorcycle engine adjacent the spark plug. Shown within coil receptacles 100 are coil mounting apertures 110, which are machined to receive 3/16 inch machine screws. The ignition coil of the preferred embodiment is a DC3-2 miniature series coil produced by Dynatek Performance Electronics, which was selected for its wide-spread acceptance in the Harley-Davidson after-market product line. The DC3-2 is sufficiently small to be fitted into coil receptacles 100 and 200, having overall dimensions of 4.2 inches by 2.3 inches by 1.6 inches. This type of ignition coil is manufactured in a housing that includes apertures for mounting the ignition coil to the frame of the motorcycle or to a frame mount, and the spacing of the apertures in the coil housing is known. The location of coil mounting apertures 110 are selected to accommodate a variety of state-of-the-art ignition coil designs. One may note in FIG. 5 that mounting apertures 130 on ignition coils 120 are elongated so as to permit positioning of the ignition coil on a variety of motorcycle frames. Thus, ignition coil 120 may be easily attached to coil receptacles 100 by means of machine screws 140. Therefore, the invention is not restricted to any specific model or manufacturer of ignition coils. The determining factors would be the electrical specifications of the coil, and its comparable physical dimensions. Concomitantly, the invention is not limited by the means by which ignition coils 120 are affixed to coil receptacles 100 and 200. For example, ignition coils 120 may be affixed by means of clips attached to coil receptacles 100 and 200. One of ordinary skill in the mechanical arts may conceive various methods by which the coils may be affixed to the receptacles.

Referring now to FIGS. 5 and 6, spark plug wires 145 connect to coil terminal 125 for transmitting the ignition spark from ignition coil 120 to spark plugs 40. Also shown are input terminals 126 which electrically communicate with the motorcycle battery (not shown).

Conjoining coil receptacle 100 and coil receptacle 200 is frame mount means 300, thereby forming coil housing 90. Frame mount means 300 is sized and configured such that when the ignition coil housing of the invention is affixed to motorcycle frame aperture 60, the respective coil receptacles 100 and 200 matingly nest with their respective cylinders of the motorcycle engine, encapsulate spark plugs 40, and provide a matching external surface corresponding to that of the cylinder. For example, the lower external surface of coil receptacles 100 and 200 include cooling fins 135. The upper external surfaces of coil receptacles 100 and 200 will be formed to provide the same surface as rocker boxes 30. In this exemplary embodiment, coil receptacles 100 and 200 and frame mount means 300 are cast of one single, integral part for added strength, however they may be forged or machined. One of ordinary skill in the art would know that after-market motor mount plates 330 are available for mounting various devices on the frame of a motorcycle. Typically, such frame mounts are L-shaped, have an aperture 340 on the long side of the L for receiving a bolt to attach to the motorcycle frame, and then with at least one aperture on the short side of the L for attachment of various components. Thus, frame mount means 300 may be configured to attach to one of these after-market motor mount plates by bolting frame mount means 300 to frame mount 330 by using aperture 310, or frame mount means 300 could be structured to include a motor mount aperture for attachment directly to the motorcycle frame.

A supplementary means of securing coil housing 90 to the motorcycle engine is accomplished by bolting each coil receptacle to its respective cylinder by means of cylinder mount apertures 70 and 80 using cylinder bolts 150 (FIGS. 7 and 8), which are 5/16 inch machine bolts. Thus, when the engine is running, heat generated by engine combustion is thermally conducted from the cylinders by means of cylinder bolts 150 and to cooling fins 135, thereby providing additional surface area of cooling fins, thereby providing additional cooling capacity to the engine.

Figure 7:
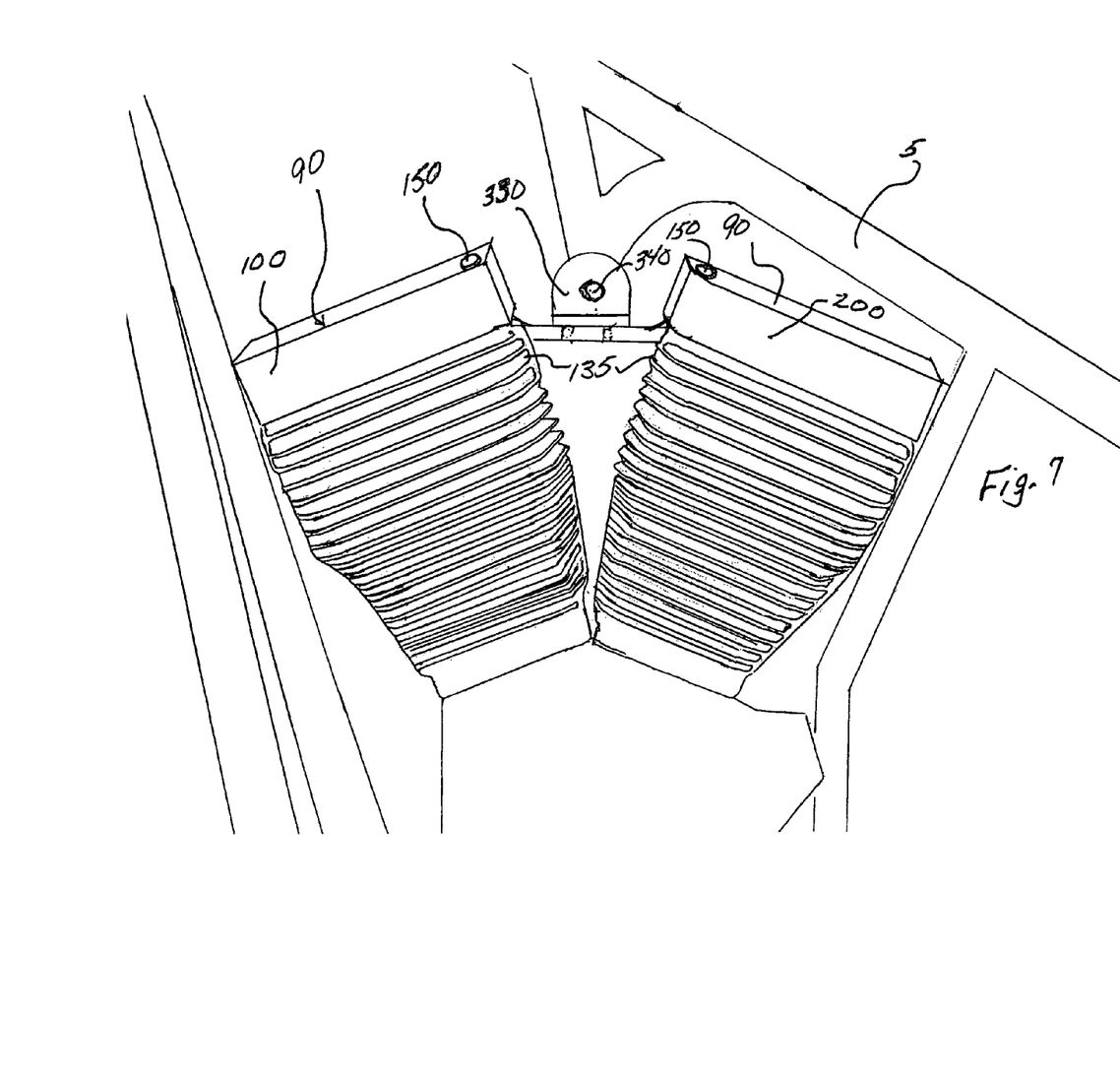
FIG. 7 is a perspective view of the motorcycle engine with the coil housing mounted thereto.
Figure 8:
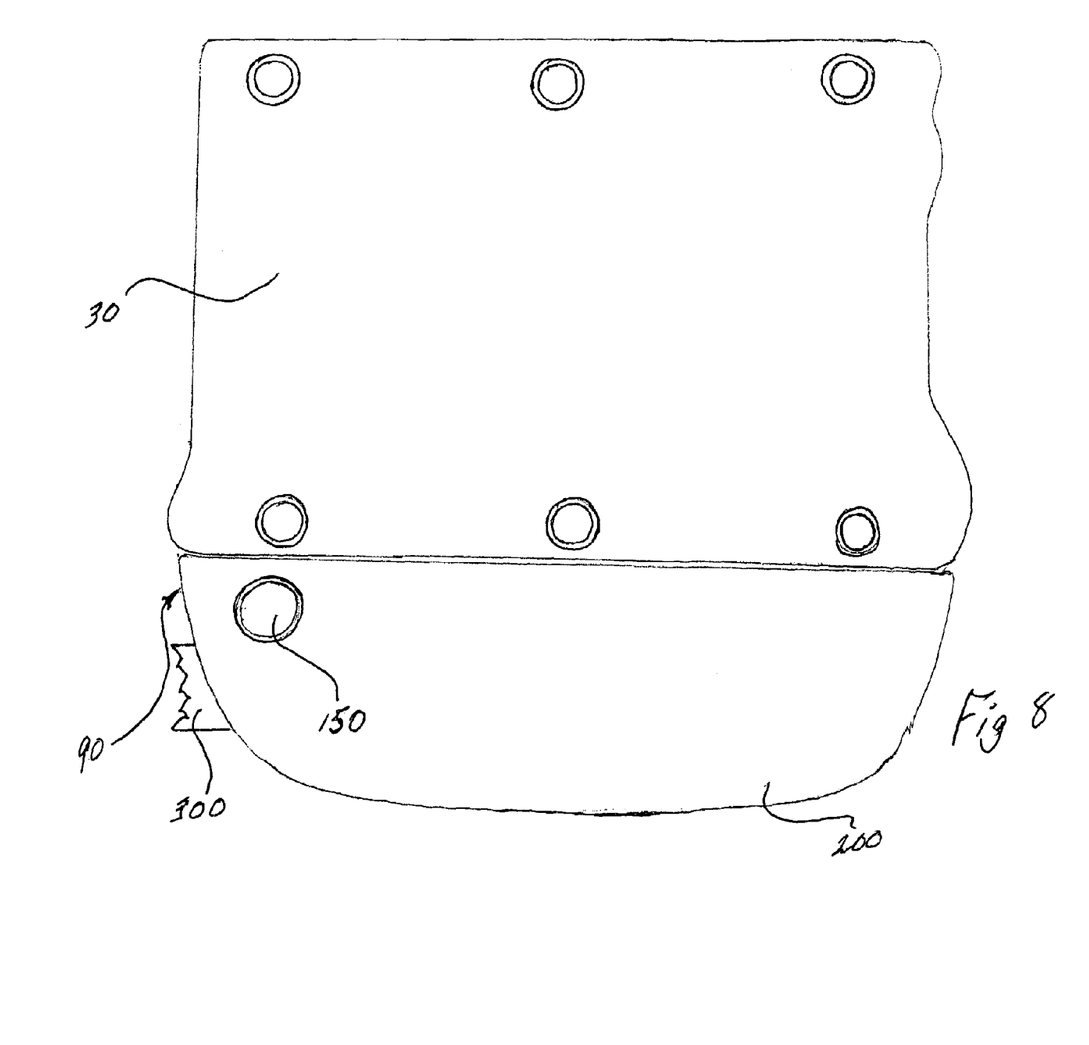
FIG. 8 is a partial top view of the coil housing of the invention.

FIGS. 7 and 8 shows coil housing 90 as mounted on engine 10. Spark plug wires 40 have been replaced with a pair of electrical wires (not shown) run from the battery to coil housing 90 through the motorcycle frame, and thus protected from possible damage. The spark plug wires 145 (FIG. 5) of the preferred embodiment are about 6–8 inches in length. Such reduction in length results in a lesser electrical resistance between the coil and the spark plug, and therefore, better ignition spark from the spark plug, thereby enabling better combustion in the engine. Cooling fins 40 and 120 extend uniformly along the longitudinal axis of each cylinder, lending a cleaner look to the cylinders, and spark plugs 40 are encapsulated and protected within coil receptacles 100.

Although preferred embodiments of the invention have been described herein in detail, it will be understood that those skilled in the art can make modifications thereto without departing from the spirit of the invention or the scope of the appended claims.

I claim:

1. Coil housing for receiving a plurality of coils for a two-cylinder motorcycle having a plurality of spark plugs and ignition coils, the housing comprising a plurality of coil receptacles, each coil receptacle having an external surface and an interior surface, the interior surface of each coil receptacle defining a cavity having means for removably receiving a coil, the coil receptacles conjoined by frame mounting means for attaching the coil housing to the motorcycle such that each coil is juxtaposed adjacent a cylinder of the motorcycle.

2. The coil housing of claim 1 wherein each coil receptacle additionally comprises means for securing each coil receptacle to its respective cylinder of the motorcycle.

3. The coil housing of claim 2 wherein the means for securing each coil receptacle to the two respective cylinders of the motorcycle comprises a cylinder mount aperture for receiving a machine bolt for securing the coil receptacle to a cylinder motor mount aperture.

4. The coil housing of claim 1 wherein the means for retaining the coil are at least one aperture for receiving a machine screw in each coil receptacle.

5. The coil housing of claim 1 wherein the external surface of each coil receptacle additionally comprises a selected number of cooling fins for heat dissipation.

6. The coil housing of claim 1 wherein each coil receptacle additionally comprises an ignition coil.

7. The coil housing of claim 6 wherein each coil receptacle additionally comprises a spark plug wire connected to an output terminal of the ignition coil, the spark plug wire for electrically communicating with the terminal of one of the plurality of spark plugs.

8. Coil housing for receiving a plurality of coils for a two-cylinder motorcycle having a plurality of spark plugs and ignition coils, the housing comprising a plurality of coil receptacles, each coil receptacle having an external surface and an interior surface, the interior surface of each coil receptacle defining a cavity having means for removably receiving a coil, the coil receptacles conjoined by frame mounting means for attaching the coil housing to the motorcycle such that each coil is juxtaposed adjacent a cylinder of the motorcycle, and wherein each coil receptacle additionally comprises means for securing each coil receptacle to its respective cylinder of the motorcycle.

9. The coil housing of claim 8 wherein the means for retaining the coil are at least one aperture for receiving a machine screw in each coil receptacle.

10. The coil housing of claim 9 wherein each coil receptacle additionally comprises an ignition coil.

11. The coil housing of claim 10 wherein each coil receptacle additionally comprises a spark plug wire connected to an output terminal of the ignition coil, the spark plug wire for electrically communicating with the terminal of one of the plurality of spark plugs.

12. The coil housing of claim 8 wherein the means for securing each coil receptacle to the two respective cylinders of the motorcycle comprises a cylinder mount aperture for receiving a machine bolt for securing the coil receptacle to a cylinder motor mount aperture.

13. The coil housing of claim 8 wherein the external surface of each coil receptacle additionally comprises a selected number of cooling fins for heat dissipation.

14. Coil housing for receiving a plurality of coils for a two-cylinder motorcycle having a plurality of spark plugs and ignition coils, the housing comprising a plurality of coil receptacles, each coil receptacle having an external surface and an interior surface, the interior surface of each coil receptacle defining a cavity having means for retaining a coil, the coil receptacles conjoined by frame mounting means for attaching the coil housing to the motorcycle such that each coil is juxtaposed adjacent a cylinder of the motorcycle, each coil receptacle having means for securing each coil receptacle to its respective cylinder of the motorcycle, and wherein the external surface of each coil receptacle additionally comprises a selected number of cooling fins for heat dissipation.

15. The coil housing of claim 14 wherein the means for retaining the coil are at least one aperture for receiving a machine screw in each coil receptacle.

16. The coil housing of claim 14 wherein the means for securing each coil receptacle to the two respective cylinders of the motorcycle comprises a cylinder mount aperture for receiving a machine bolt for securing the coil receptacle to a cylinder motor mount aperture.

17. The coil housing of claim 14 wherein each coil receptacle additionally comprises an ignition coil.

18. The coil housing of claim 17 wherein each coil receptacle additionally comprises a spark plug wire connected to an output terminal of the ignition coil, the spark plug wire for electrically communicating with the terminal of one of the plurality of spark plugs.

19. Coil housing for receiving a plurality of coils for a two-cylinder motorcycle having a plurality of spark plugs and ignition coils, the housing comprising a plurality of coil receptacles, each coil receptacle having an external surface and an interior surface, the interior surface of each coil receptacle defining a cavity having means for retaining a coil, each coil receptacle having an ignition coil retained therewithin, each coil receptacle having a spark plug wire connected to an output terminal of the ignition coil, the spark plug wire for electrically communicating with the terminal of one of the plurality of spark plugs, the coil receptacles conjoined by frame mounting means for attaching the coil housing to the motorcycle such that each coil is juxtaposed adjacent a cylinder of the motorcycle, each coil receptacle having means for securing each coil receptacle to its respective cylinder of the motorcycle, and wherein the external surface of each coil receptacle additionally comprises a selected number of cooling fins for heat dissipation.

20. The coil housing of claim 19 wherein the means for retaining the coil are at least one aperture for receiving a machine screw in each coil receptacle, and wherein the means for securing each coil receptacle to the two respective cylinders of the motorcycle comprises a cylinder mount aperture for receiving a machine bolt for securing the coil receptacle to a cylinder motor mount aperture.

* * * * *